United States Patent [19]

Nielsen et al.

[11] 4,194,467
[45] Mar. 25, 1980

[54] COW MILKING SYSTEM

[75] Inventors: Floyd P. Nielsen; Bernard O. Anderson, both of Glendale, Ariz.

[73] Assignee: Nielsen Industries, Inc., Phoenix, Ariz.

[21] Appl. No.: 916,633

[22] Filed: Jun. 19, 1978

[51] Int. Cl.² .................................... A01K 1/12
[52] U.S. Cl. ............................. 119/14.03; 119/27
[58] Field of Search ............... 119/14.03, 16, 27, 28, 119/52 AF, 56 R

[56] References Cited

U.S. PATENT DOCUMENTS

| | | | |
|---|---|---|---|
| 1,540,290 | 6/1925 | Selinger et al. | 119/56 R |
| 2,198,048 | 4/1940 | Babson et al. | 119/27 |
| 2,969,039 | 1/1961 | Golay | 119/14.03 |
| 3,368,529 | 2/1968 | Ferris | 119/52 AF |
| 3,738,320 | 6/1973 | Holm | 119/14.03 |
| 3,810,442 | 5/1974 | Jacobs et al. | 119/14.03 |
| 3,885,528 | 5/1975 | Vandenberg | 119/27 X |

*Primary Examiner*—Hugh R. Chamblee
*Attorney, Agent, or Firm*—Charles E. Cates

[57] ABSTRACT

The disclosure teaches a novel cow milking system which provides an adjustable width aisle having a milking side and a head side, a fixed fence disposed on the milking side, a moveable herring-bone fence adapted to move as an integral unit disposed on the head side and having stanchion means for engaging the shoulders of the cows and moving them back to a desired position; and means for moving the herring-bone fence that, in a preferred embodiment, is a plurality of links pivotally attached to the fence and to a plurality of fixed anchor points. Also, gate means to control the ingress and egress of the cows are provided.

A novel feed dispensing means is also taught by the disclosure. There is provided a funnel for each cow stall, means of conveying the feed at a desired, measured rate from a source of feed to said funnels, a wheel with radial compartments for holding a measured amount of feed disposed in the funnel, and means for directing the feed into the compartments seriatim from the funnel. Feed trough means are provided below the funnel and means for rotating a plurality of wheels in unison at a predetermined rate to deliver a measured amount of feed to each cow from one of the compartments in the associated wheel during the milking cycle are also provided. The feed dispensing means for rotating a plurality of wheels in the funnels in unison at a desired rate has an axle connecting the wheels and means to turn the axle, such as an electric motor. The rate of delivery may be varied according to the need of the herd being milked.

In another aspect, the disclosure teaches the combination of the feed dispensing means with the cow milking system.

7 Claims, 6 Drawing Figures

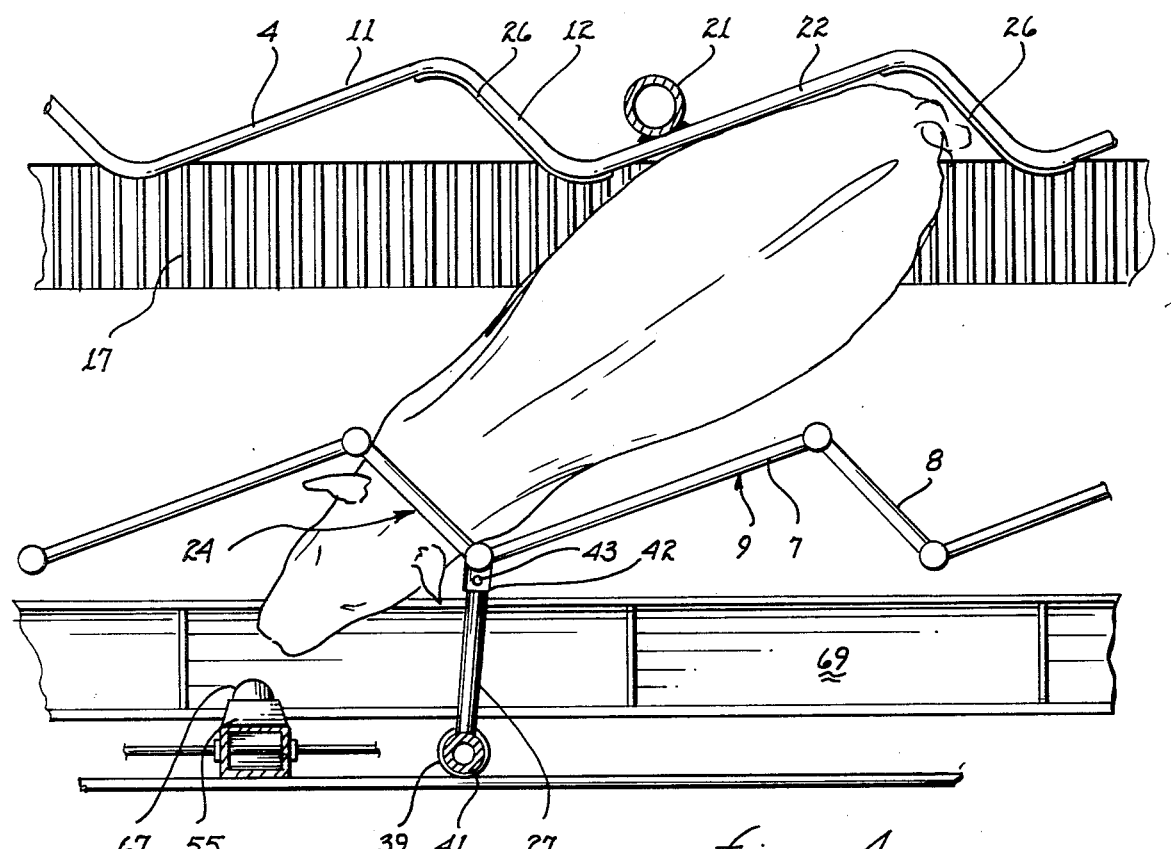
fig. 4
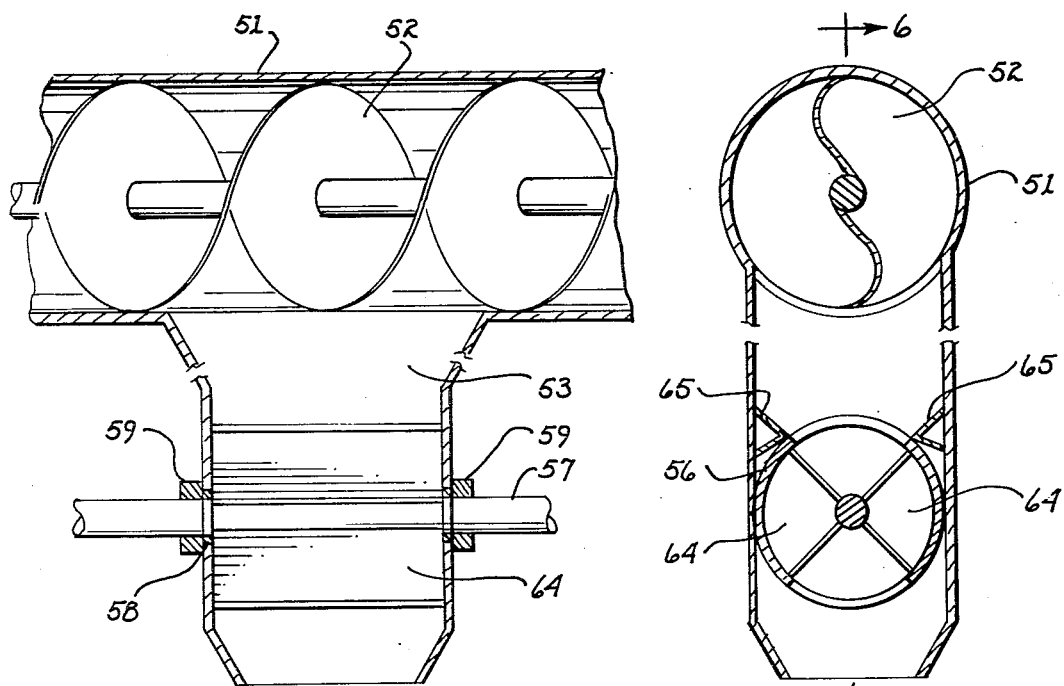
fig. 6
fig. 5

COW MILKING SYSTEM

BACKGROUND OF THE INVENTION

This invention relates to cow milking systems, particularly to cow milking parlors of the herring-bone type and improvements therein.

The basic herring-bone milking system known to the prior art is illustrated in the patent to Golay, U.S. Pat. No. 2,969,039. The herring-bone system (which is there called an echelon milking system) recognizes the psychological need of the cow to be in close communication with other members of the herd.

It provided a floor, along one side of which were mounted a plurality of feed boxes and along the opposite side of which were provided a series of splash guards which limited the open walking space between the feed boxes and the splash guard. At the far end of the area there was provided in the prior art a gate normally closed and disposed at an angle of about 30° in relation to the line of splash guards.

A second gate at the entering end of the area was provided and was initially maintained open, such that a group of cows could be herded into the first, or entering, gate and would walk single file down the aisle thus created until the lead cow came to the closed exit gate. The feed box adjacent to that gate would have been filled to induce the lead cow to come to that position and the gate would urge the position of the cow to approximately a 30° angle. The remaining cows would follow in and take their places at their respective feed boxes at about the same angle and would crowd together in touching relationship, thereby maintaining the herd relationship.

In the prior art arrangement each cow's udder was presented along the splash guard side of the area and there was provided a sunken floor below the floor on which the cows stood wherein a milking operator could move about to manipulate the mechanical milker and connect it to individual cows without having to push one cow away from the other, or stand between them. The cows's udders could also be washed from this position. After the milking operation was completed the exit gate would be opened and the cows would be driven out of the milking area.

This was a decided advantage over prior systems, allowing one man to handle an increased number of milking operations in the same length of time. Nevertheless, there still remained a need to further speed up the process and to more conveniently adjust the system to cow herds of differing sizes. Patents to Jacobs, et al, U.S. Pat. No. 3,810,442 and Holm, U.S. Pat. No. 3,738,320 represent attempts in the prior art to speed up the process and to adjust for cow sizes. Vandenburg, U.S. Pat. No. 3,885,528 represents the prior art attempts to speed up the process.

The common problem with the prior art cow milking systems were that cows resisted rapid movement through the systems and often balked at management by the operator. Herds of short cows were still difficult for the operator to reach and handle properly. Attempted solutions for the problems tended to be overly elaborate, involving complicated machinery and electrical gadgetry that tended to make the system expensive to build and maintain, subject to breakdown, and difficult for untutored labor to cope with.

Rising costs of labor and material have been serious pressures on the dairy operator's profits. A long felt, standing need for improvements in the foregoing respects to cow milking systems has existed and yet remains to be satisfied.

BRIEF SUMMARY OF THE INVENTION

According to the teachings of the invention disclosed in this application, there is provided a novel cow milking system which has the following elements: an aisle having a milking side and a head side; a fixed fence disposed on the milking side; a moveable herring-bone fence disposed on the head side and having means for engaging the shoulders of the cows and moving them back to a desired position relative the milking pit; and means for moving the moveable herring-bone fence, conveniently as an integral unit, the elements of which may be a plurality of fixed anchor points. The system conveniently has gate means to control the ingress and egress of the cows.

There is also provided a novel feed dispensing means. There is provided means for conveying feed from a store of feed at a desired measured rate, a funnel for each cow stall, each funnel having a wheel disposed therein which has a plurality of radial compartments adapted to hold a desired amount of feed; means for directing the feed into the funnel and then into the compartments, seriatim, from the upper part of the funnel; feed trough means disposed below the funnel; and means for rotating the wheels in the several funnels in unison, at a predetermined rate, to deliver a measured amount of feed to each cow during the milking cycle.

The feed dispensing means for rotating the plurality of wheels in the funnels, in unison, at a predetermined rate, has an axle connecting said wheels and means to turn the axle, which conveniently may be an electric motor. The rate of speed by which the wheel of the feed dispensing means is turned is adjustable so that the rate of delivery of the feed may be varied according to the needs of the herd.

In another aspect, the invention is a combination of the feed dispensing means with the cow milking system.

The invention disclosed herein meets and overcomes the problems of the prior art. The invention permits the opening of the aisle to a much wider distance than formerly found possible in the prior art and, advantageously, the cows move more quickly into and out of the milking area. It is surmised that this may result from the fact that the cow no longer fears bumping or hitting her hips against the head side or milking side of the aisle. Additionally, it is no longer necessary to have a covered feed bowl and, therefore, the cows do not have the fear of sticking their heads in a closely confining feed bowl.

An important feature of the invention is that the moveable fence controls the cows by pressure on their shoulders whereas prior art devices controlled cows by their noses, or not at all. This is especially significant in adjusting for short cows that must be backed up to present their udders to the milking pit. Prior art attempts at solutions of the problem, e.g. Holms, U.S. Pat. No. 3,738,320 controlled the cows' noses, or e.g. Jacobs, U.S. Pat. No. 3,810,442 resorted to expensive and potentially troublesome moving platforms and machinery to shorten stalls. In neither case in the prior art could there be an opening of the aisle width during ingress and egress of the cows.

Another agreeable result is that the air in the stalls is fresher and freer flowing and does not become stagnant as occurred in the prior art milking systems which required covered feed bowls. Neither is it now necessary for the cows to walk along the aisle with one foot in the gutter, which possibly allays to some extent the anxiety of the cows.

Moreover, the expensive moving parts and electronic gadgetry of the prior art are avoided, resulting in a less expensive installation and more trouble free maintenance. In addition, less skilled labor may be employed to operate the system, resulting in a savings in training costs.

Detailed Description of the Preferred Embodiments

Turning now to the drawings in which the presently preferred embodiment of the invention is illustrated:

FIG. 4 is a plan view of an enlarged portion of the milking parlor facility of FIG. 1, showing a cow utilizing the system;

FIG. 5 is an enlarged, sectioned detail of the feed dispensing means shown in FIG. 3, taken along the lines 5—5;

FIG. 6 is a sectioned view of the feed dispensing mechanism shown in FIG. 5, taken along the lines 6—6.

Cow Milking System

Figure 1:
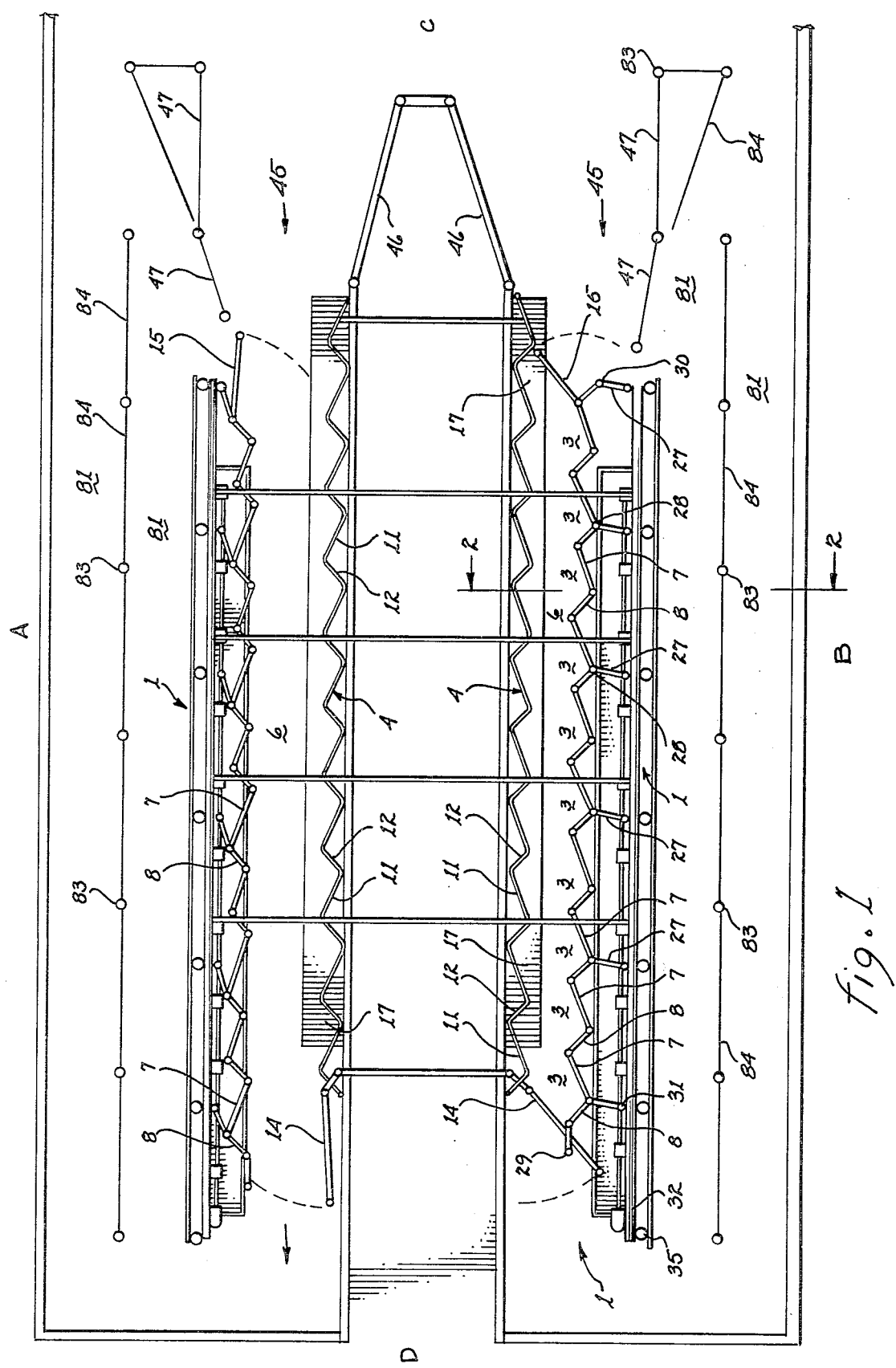
FIG. 1 is a plan view of a milking parlor embodying the cow milking system of the invention.

Referring now to FIG. 1, the invention is embodied in a milking barn having two systems 1 served by single operator's pit 2. The milking stalls 3 (for convenience identified in one system only by number) are positioned diagonally along each side of the operator's pit 2 to form a herring-bone type milking parlor. When cows are in the milking stalls 3 their hindquarters are directed diagonally toward the operator's pit 2, enabling a single operator side access to the udders of the cows in both systems 1.

The cows are confined in their stalls 3 by side bars 7 and front bars 8 of the head side fence 9 and by the side rail 11 and back rail 12 of the milking side fence 4, and by the pressure of neighboring cows and/or either the exit gate 14 or entrance gate 15.

The operator's pit 2 is in the center of the barn between the two systems 1, and the floor 36 of the pit 2 is lowered a convenient distance to make the cows' udders accessible to the operator without undue stooping. The milking side fence 4 is stationary.

Immediately adjacent the operator's pit 2 is the ground level aisle 6. On the milking side 5 of the aisle 6 is constructed a continuous grate 17 which covers a gutter 18 for conducting excreta and debris which may be carried into the aisle 6 and dropped by the cows.

Whereas, typically the aisle in the prior art is only 30 to 36 inches wide which forces the cow to walk with one foot on the gutter grate, one of the serendipitous results of the invention of this application is that the aisle width can be opened to forty inches, which makes it unnecessary for the cows to walk on the grate or to risk bumping their hips on the sides. This seems to be a surprising factor in moving the cows much faster, notwithstanding the relatively small increase (about 4 inches) in aisle width.

Figure 3:
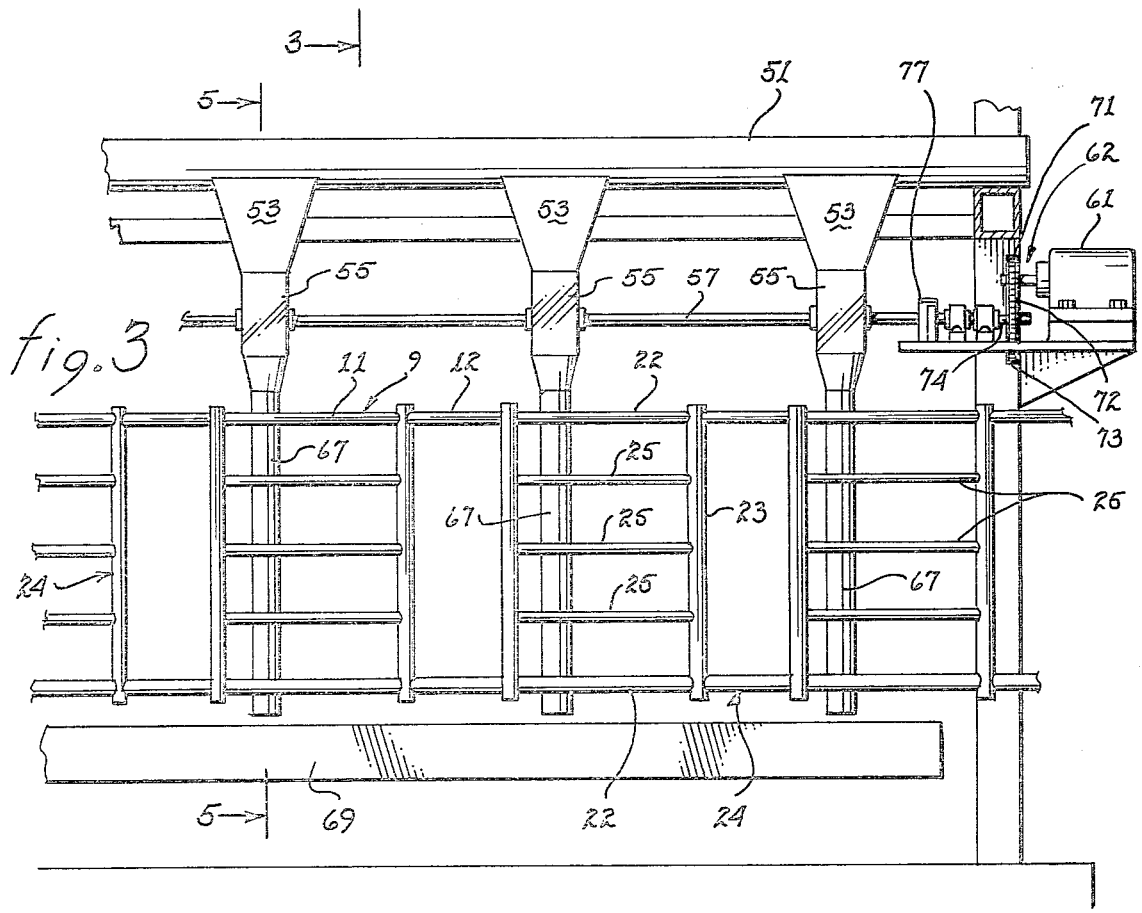
FIG. 3 is a view, in elevation, of the portion of the dairy barn facility shown in FIG. 2, taken along the lines 3—3.

The stationary milking side fence 4 is best seen in FIG. 4. It can be further visualized by reference to the configuration and structure of the head side fence 9 as shown in FIG. 3. The principal difference between the fences is that the milking side fence 4 is fixed in place and supported by posts 21 to which the horizontal rails 22 are welded. Vertical support stems 23 are in turn welded to the horizontal rails 22 to provide spacing and support. Further rigidity is provided by welding auxiliary rails 25 to the vertical rails 23. A splash panel 26 is provided on the milking side fence.

The head side fence is constructed in approximately the same manner as the milking side fence 4, except that the head side fence is not fixedly attached.

From one end 29 to a second end 30 the fence is rigid and constructed in a herring-bone shape. It has a plurality of links 27 pivotally attached at various points 28. The lengths 27 are pivotally connected at points 31 to anchor rails 32 which are in turn welded to uprights 35.

Figure 2:
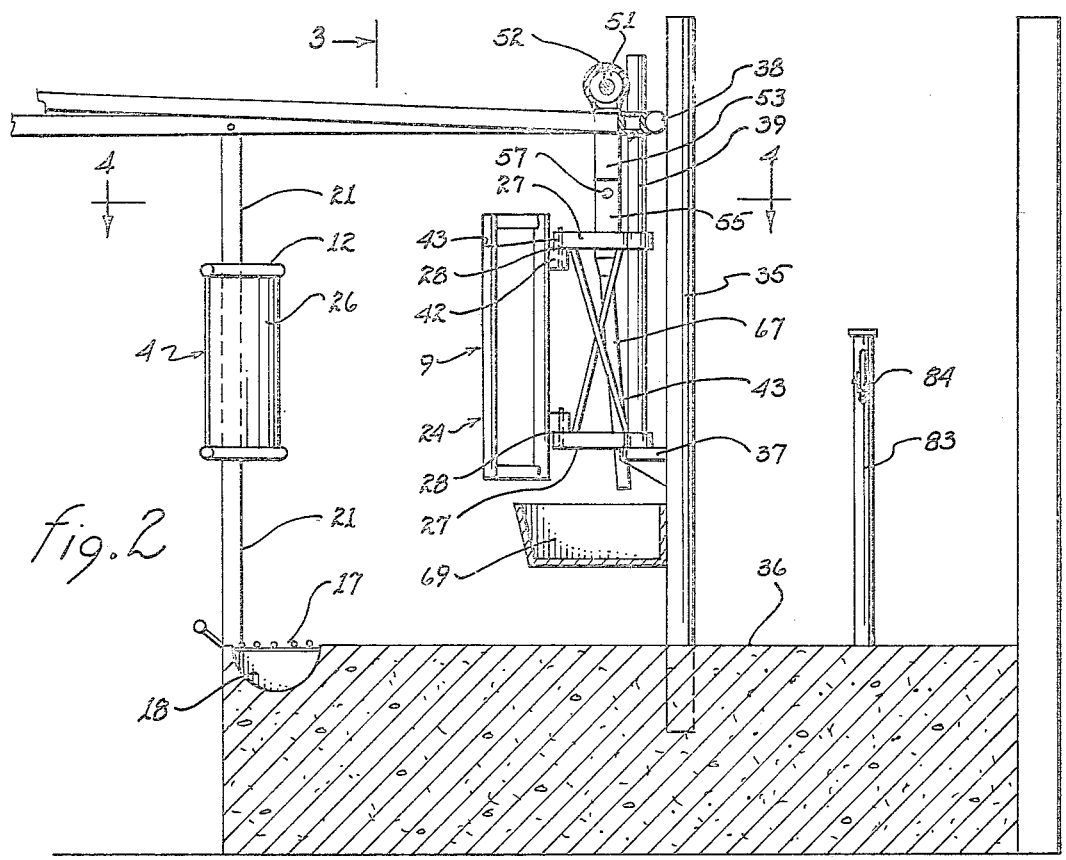
FIG. 2 is an elevation view, in section and enlarged, of a portion of the milking barn facility of FIG. 1, taken along the lines 2—2.

Referring now to FIGS. 2 and 4 for details of the mechanism, FIG. 2 shows pillar 35 embedded in the concrete floor 36 of the barn and attached to the ceiling (not shown) for additional support, carrying support arm 37 and cross brace 38 which cooperate to support hinge post 39. Although the detail is not shown, the links 27 are rotatably supported on the support arm 37 and hinge post 39 by tapered bearings 41, such as may be obtained under the Timken brand.

The pivot points 28 are constructed with an ear 42 carrying a hinge pin 43 journalled in a bore in the end of the link 27. The upper and lower links 27 are braced by cross member 43. The head side fence 9 is moved out and in by manually moving the fence 9.

Operation of the System

In FIG. 1 the system on side A is shown in open position to permit the cows to move in and out, and the system on side B is shown in closed position which is the position the fence 9 is moved to after the cows are in the stalls 3.

The cows enter from side C and are herded in the direction of the arrows 45. To permit the cows to enter the aisle 6 the head side fence 9 is fully retracted as shown on side A of FIG. 1. At this point in time, the entrance gate 15 is open to permit the cows to pass down the aisle 6 and the exit gate 14 is closed. Rails 46, in cooperation with guides 47, direct the cows into the aisle 6 from the holding pen (not shown).

The lead cow is urged to the stall nearest the exit by the herd following, and each cow takes her place in the adjoining stall until all of the stalls are filled, at which time entrance gate 15 is closed, and the fence 9 is adjusted to fit the cows. The cows are easily moved back to the desired position for milking by means of the stanchion which bears on their shoulders.

When the feeding-milking cycle is complete, the exit gate 14 is opened and the fence 9 is retracted. The cows are herded out the exit and through exit lanes 81 which are defined by posts 83 and chains 84 attached thereto.

Feed Dispensing Means—Structure and Operation

A measured amount of feed is placed in the feed trough serving each stall by the feed mechanism whose elements and functions will be now explained:

As can be best seen in FIGS. 2, 3, 5 and 6, the feed dispensing means conducts feed from a store of feed (not shown) through a conduit 51 by means of a continuous screw 52 which moves the feed at a measured rate to hoppers 53. The hopper funnels down to a neck 55 in which is disposed a wheel 56 carried by an axle 57. The axle 57 is journalled in apertures 58 on bearings 59, all of which are moved in unison by means of motor 61 and gear train 62. The gear train which gears down the 6 rpm motor speed to 2 rpm, consists of a sprocket 71 attached to the take-off shaft of the motor 61, chain 72, second sprocket 73 attached to the drive shaft 74, journalled in bearings 75, 76, drive shaft 74 drives axle 57 by means of slip clutch 77.

Each of the wheels has a plurality of compartments 64 which hold a measured predetermined amount of feed. Grain from the hopper is directed into the hopper by guides 65. As the wheel turns any excess will be scooped off the compartment 64 by the guide 65 to the end that a measured amount will eventually fall as the wheel turns from the compartment through the delivery tube 67 to the trough 69.

A presently preferred embodiment of the invention has been described in detail. From the teachings of this specification, persons ordinarily skilled in the art will appreciate that various equivalent modifications will be possible, all of which are within the scope and spirit of the invention, as pointed out in the appended claims.

What is claimed is:

1. A cow milking system comprising:
   a. floor means having means defining an aisle, said aisle having:
      (1) a milking side, and
      (2) a head side;
   b. a fixed fence disposed on said milking side;
   c. means for supporting said fixed fence;
   d. a moveable herring-bone fence
      (1) disposed on said head side, and
      (2) having means for engaging the shoulders of the cows; said fence being adapted to move as an integral unit; and
   e. means for supporting said movable fence, and
   f. means for moving said fence as a unit in and out of said aisle, whereby successive groups of cows of different sizes can be positioned advantageously relative said milking side by moving said fence, and said aisle can be widened temporarily for ingress and egress.

2. The system of claim 1 with the addition of gate means to control the ingress and egress of the cows and means for supporting said gate means on said floor means.

3. The system of claim 1 wherein the means for moving said fence comprises:
   a. a plurality of attachment points on said fence;
   b. a plurality of anchor points; and
   c. a plurality of links pivotally attached to said points on said moveable fence and to said fixed anchor points.

4. The system of claim 1 wherein the means for engaging the shoulders of the cows is integral with said moveable fence.

5. The cow milking system of claim 1 in combination with feed dispensing means comprising a store of feed and a plurality of funnels having a plurality of wheels disposed in and blocking each said funnel; radial compartments disposed in said wheels holding a desired amount of feed; means for filling said compartments; feed trough means disposed below said funnels; means for conveying feed at a desired measured rate from said store to said funnels; and means for rotating said plurality of wheels in unison at a desired rate, whereby the feed is delivered from the store to the said trough at a measured rate for consumption.

6. The feed dispensing means of claim 5 wherein said means for rotating said plurality of wheels in unison at a desired rate comprises an axle connecting said wheels, and means to turn said axle.

7. The dispensing means of claim 5 wherein the speed at which said wheel is turned is adjustable to vary the rate of delivery of feed.

* * * * *